May 16, 1950  S. B. HASELTINE  2,507,786
DETACHABLE LATCH MEANS FOR DOOR FASTENERS
Filed June 18, 1947
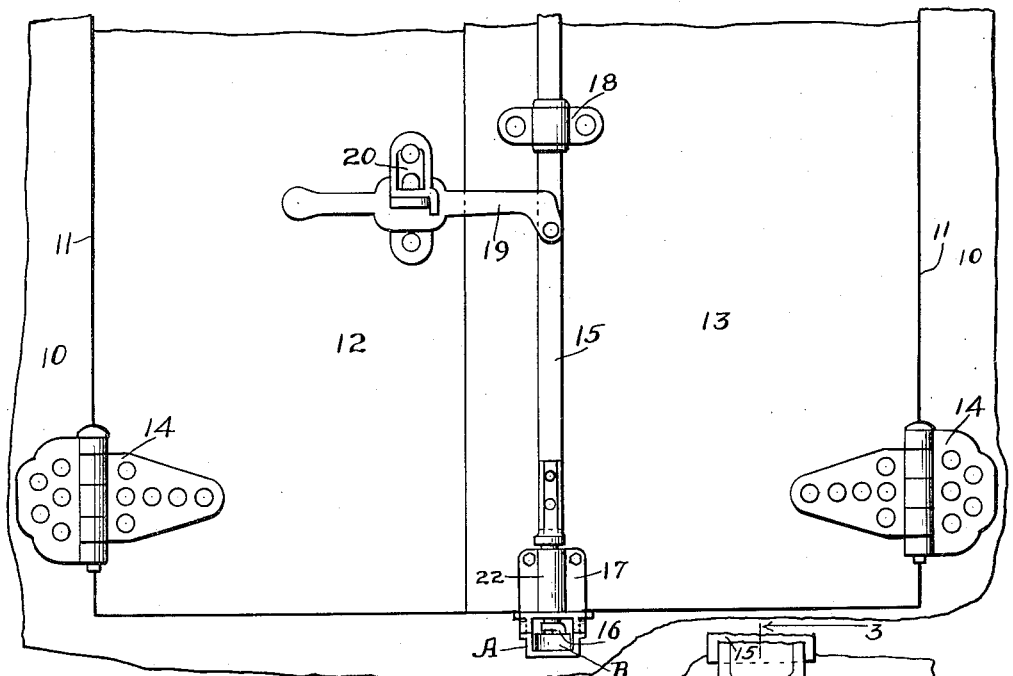
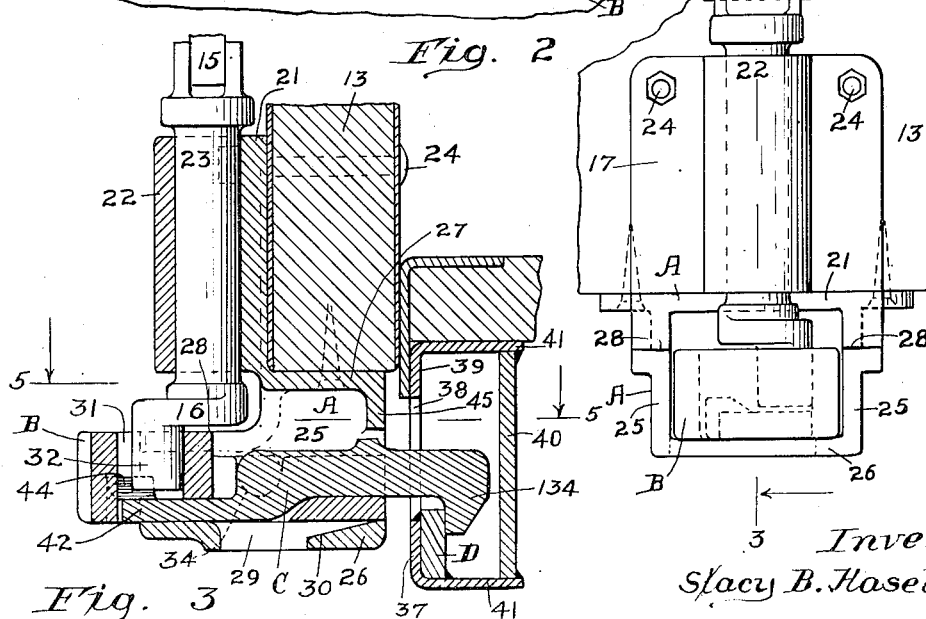
Inventor:
Stacy B. Haseltine.
By Henry Fuchs.
Atty.

May 16, 1950     S. B. HASELTINE     2,507,786
DETACHABLE LATCH MEANS FOR DOOR FASTENERS
Filed June 18, 1947     2 Sheets-Sheet 2
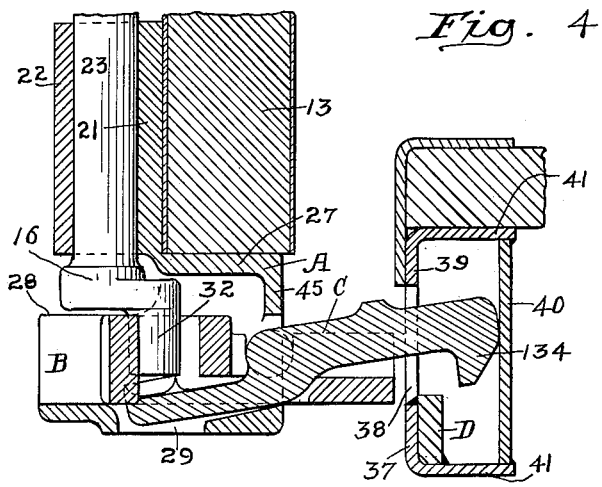
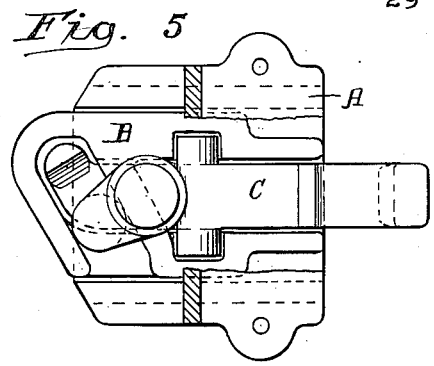
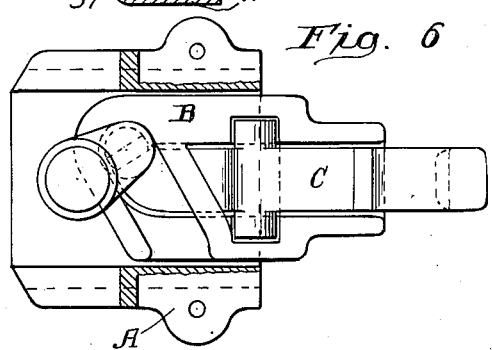
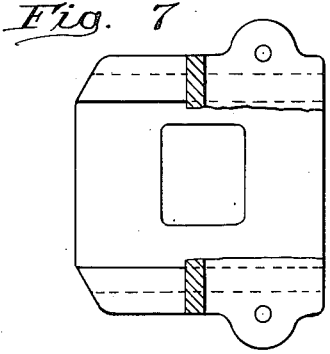
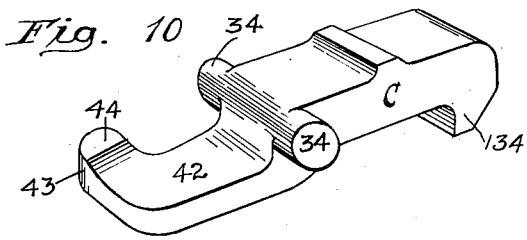
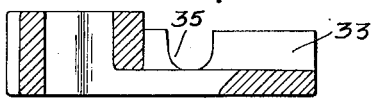
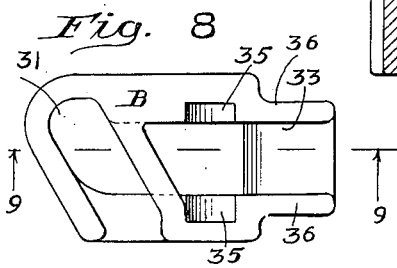
Inventor:
Stacy B. Haseltine.
By Henry Fuchs
Atty Patented May 16, 1950

2,507,786

UNITED STATES PATENT OFFICE 2,507,786

DETACHABLE LATCH MEANS FOR DOOR FASTENERS

Stacy B. Haseltine, La Grange, Ill., assignor to W. H. Miner, Inc., Chicago, Ill., a corporation of Delaware Application June 18, 1947, Serial No. 755,415

7 Claims. (Cl. 292—111)

This invention relates to improvements in detachable latch means for door fasteners of automobile trucks.

One object of the invention is to provide a door fastener for hinged doors of automobile trucks, comprising a vertically disposed, rotary operating bar mounted on the door having crank members at the top and bottom ends thereof wherein the crank members cooperate with a top keeper and a bottom latch member, the bottom latch member being detachably anchored to the truck body and carried by the door to be moved clear of the end of the truck body with the door when the latter is swung open, thereby protecting the latch member against damage when the truck is backed against any object, such as a loading platform or wall of a building, the latch member being provided with a pivoted hook element for anchoring the latch member to the truck body.

A further object of the invention is to provide a detachable latch member, as set forth in the preceding paragraph, wherein the pivoted hook element, which anchors the latch member to the truck body, is automatically tripped by the operation of the door fastener mechanism after the door has been forced partly open to disconnect the latch member from the truck body and permit the same to be moved to out of the way position with the door as the latter is swung fully open.

Other objects of the invention will more clearly appear from the description and claims hereinafter following.

In the accompanying drawings forming a part of this specification, Figure 1 is an elevational view, partly broken away, of the rear end of the body of an automobile truck provided with hinged doors, illustrating my improvements in connection therewith. Figure 2 is a front elevational view, on an enlarged scale, of the mechanism shown at the lower end portion of the right hand door of the truck. Figure 3 is a vertical sectional view, corresponding substantially to the line 3—3 of Figure 2. Figure 4 is a view similar to Figure 3, showing the parts in the positions occupied when the door has been forced partly open. Figure 5 is a horizontal sectional view, corresponding substantially to the line 5—5 of Figure 3, the end of the truck body being omitted. Figure 6 is a view similar to Figure 5, showing the position of the parts when the door has been forced open to the extent shown in Figure 4. Figure 7 is a view similar to Figure 5, with the operating bar and sliding latch member omitted. Figure 8 is a plan view of the sliding latch member of my improved mechanism. Figure 9 is a vertical sectional view, corresponding substantially to the line 9—9 of Figure 8. Figure 10 is a detailed perspective view of the pivoted hook element of my improved mechanism.

In said drawings, 10 indicates the rear end wall of an automobile truck having a door opening 11 therein, closed by a pair of hinged doors 12 and 13. The doors 12 and 13 are swingingly supported by the usual hinges 14 along the outer edges thereof. As is common practice, the inner edge of the door 12, which is the door first closed, is overlapped by the inner edge of the door 13.

The improved door fastener embodying my improvements is of a well-known type, comprising a rotary operating bar 15 having the usual crank members at opposite ends thereof, the crank member at the lower end thereof, which is indicated by 16, only being shown. As is well understood, the upper crank member, not shown, cooperates with the usual slotted keeper, fixed to the end wall of the truck above the door opening to force the door open and closed when the bar is rotated. The bar 15 extends vertically of the door 13 and is supported by the usual bearing brackets, the lower and intermediate brackets only being shown in the drawing, the lower bracket being indicated by 17 and the intermediate bracket by 18. The bar 15 is provided with an actuating handle lever 19 by which it may be rotated, the lever being pivoted to the bar so that it may be dropped to pendant position. The usual latch means, which is mounted on the door 12, for locking the bar 15 in position with the doors closed, is indicated by 20.

My improved construction comprises broadly a stirruplike guide member A on the lower bracket 17, a sliding latch member B carried by the guide member A, a pivoted hook element C, and a keeper D with which the hook element C is engageable.

In carrying out my invention, the lower guide bracket 17 is made of two-part construction, comprising back and front plates 21 and 22 between which the shank portion 23 of the lower crank member 16 is journaled, the plates 21 and 22 being fixed to the lower end of the door 13 by securing bolts 24 extending through the plates and the body of the door.

The back plate 21 carries the stirruplike guide member A, which depends therefrom and is formed integral with the same. The guide member A extends beneath the door 13 and comprises vertically disposed, laterally spaced side walls 25—25, a horizontal bottom wall 26, and a top wall 27. The top wall 27 and the side walls 25—25 are continuous with the back plate 21, and the portions of the side walls which extend outwardly beyond the door 13 are cut away at their upper sides, as indicated at 28—28. The top wall abuts the underneath edge of the door 13 and terminates short of the forward or outer ends of the side walls of the guide member or stirrup A. The bottom wall 26 is provided with an opening 29 therethrough to accommodate the hook element C for tilting movement, as hereinafter pointed out. Rearwardly of the opening 29, the upper surface of the bottom wall 26 is beveled off or inclined upwardly, as indicated at 30, to provide clearance for the element C in its tilting movement.

The sliding latch member B is in the form of an elongated plate guided in the stirrup A for sliding movement between the side walls 25—25. At its forward end, the member B has a transversely extending, upwardly opening cam slot 31 within which the crank pin 32 of the lower crank member 16 is engaged. Rearwardly of the slot 31, the latch member B has an upwardly opening, lengthwise extending slot 33 within which the hook element C is accommodated. The slot 33 opens through the rear wall of the cam slot 31, and the forward end of the hook element extends into the slot 31.

The hook element C, which is accommodated in the slot 33, is provided with laterally extending, transversely aligned trunnions 34—34, midway between the ends thereof, by which it is swingingly supported on the latch member B, the trunnions being journaled in upwardly opening bearing seats 35—35 in the opposed walls 36—36 of the latch member, which side walls define the slot 33. At the rear end, the hook element terminates in a depending hook 134 adapted to engage with the keeper D, which is in the form of a plate or bar secured to the end sill 37 of the automobile truck. As shown in Figure 4, the end sill 37 of the truck is of channel-shaped form and has an opening 38 in the vertical web 39 thereof through which the hooked end of the element C may freely pass. The keeper D is welded to the inner side of the web 39 at the lower side of the opening 38, preferably having its upper edge extending slightly above the lower wall of said opening. Spaced inwardly or rearwardly from the web 39, an abutment plate 40 is provided with which the outer or rear end of the hook element C is engageable, the plate 40 being welded along its edges to the top and bottom flanges 41—41 of the web 39 of the sill 37.

The hook element C, as hereinbefore stated, extends into the cam slot 31 of the latch member B, being provided with a forwardly projecting tail portion 42 of reduced thickness having an angularly projecting toe 43 at its extremity, accommodated in and registering with the closed end portion of the cam slot 31. The toe portion 43 has an upstanding cam projection 44 at its outer end on which the lower extremity of the crank pin 32 of the lower crank member 16 is adapted to ride to effect tilting or swinging movement of the hook element C. To prevent disengagement of the hook element from the stop plate 40 of the end sill when the door is locked in closed position, the top wall 27 of the stirrup member is provided with a depending flange 45 at its rear end which blocks upward movement of the hook element.

The operation of my improved door fastener is as follows: Assuming that the doors 12 and 13 are in the closed position shown in Figure 1, and that the doors are to be opened, the attendant, after unlatching the lever 19, swings the same toward the right from the position shown in Figure 1, thereby rotating the operating bar in contraclockwise direction, as viewed in Figure 5, from the position shown in Figure 5 to the position shown in Figure 6, the bar 13 being rotated through an angle of approximately 180 degrees. During this rotation of the bar, the pin 32 of the lower crank member engages the inner or rear wall of the cam slot 31 of the sliding latch member B, forcing the same rearwardly against the abutment wall or plate 40 of the end sill 37 of the truck. Inasmuch as the latch member B is thus held stationary by being buttressed against the plate 40, rotation of the crank member 16 forcibly cams the door outwardly. At the same time, the upper crank member, cooperating in the usual manner with the upper keeper, also acts to cam the door outwardly. As the parts move from the position shown in Figure 5 toward the position shown in Figure 6, and the crank pin 32 travels toward the inner or closed end of the slot 31, the pin rides up on the cam 44 of the tail 42 of the hook element C, thereby forcibly tilting the latter upwardly, as shown in Figure 4, and lifting the hooked end of the same to a sufficient height to clear the keep bar D. After the door has thus been forced to partly open position, the attendant manually swings both doors fully open. As will be evident, inasmuch as the latch member B is carried by the door 13, it is swung to an out of the way position with the door, thereby protecting the latch member against damage when the truck is backed against a loading platform or similar object.

In forcing the doors closed, the reverse procedure is followed. The doors are first swung to partly closed position, thereby bringing the keeper engaging crank pin of the crank member at the upper end of the bar 15 in the position to enter the cam slot of the upper keeper and the hooked end of the hook element C of the sliding latch member B into overhanging relation to the keeper D. Upon the bar 15 being rotated in clockwise direction, as viewed in Figure 6, the crank pin 32 of the lower crank member is swung against the front or outer wall of the cam slot 31 to actuate the sliding latch member B. During the initial portion of this movement of the lower crank member, the crank pin thereof rides off of the cam projection 44 of the hook element C, thereby permitting the hook element to drop and engage the hook 134 thereof in back of the keeper D. With the hook of the element C thus operatively engaged, the camming action of the pin of the lower crank member within the slot 31 of the member B forcibly pulls the door shut, as shown in Figure 3. At the same time, the upper crank member, cooperating in the usual well-known manner with the upper keeper, also acts to force the door closed.

I claim:

1. In a door fastener for a hinged door of a container, the combination with a rotary operating bar mounted on the door; of a sliding member on the door; a movable latch element on said member, said latch element being engageable with the container to lock the sliding member thereto; a crank member on said bar having a crank pin engaging said sliding member to slide the same forwardly and rearwardly with respect to the door; and cooperating cam means on said latch element and crank pin for effecting locking engagement of the latch element with the container and disengagement of the same therefrom.

2. In a door fastener for a hinged door of a container, the combination with a rotary operating bar mounted on the door; of a sliding member on the door; a pivoted latch element on said member, said latch element having a hooked end engageable with the container to lock the sliding member thereto; a crank member on said bar having a crank pin engaging said sliding member to slide the same forwardly and rearwardly with respect to the door; and cooperating cam means on said latch element and crank pin for effecting rocking movement of the latch element to disengage said hooked end from and engage the same with said container.

3. In a door fastener for a hinged door of a container, the combination with a vertically disposed operating bar mounted on the door; of a sliding member; a pivoted latch element carried by said sliding member and having detachable hooked engagement with the container; a crank member on said bar rotatable therewith and engaged with said sliding member to reciprocate the same; and cooperating cam means on said crank member and latch element for effecting hooked engagement of said latch element with, and disengagement of the same from, the container.

4. In a door fastener for a hinged door of a container, the combination with a reciprocating slide on said door; of a hook pivoted on the slide and engageable with the container for detachably anchoring the slide to the container; operating means carried by said door for reciprocating said slide with respect to the door; and cooperating cam means on said pivoted hook and operating means for lowering and raising the hook to engage the same with, and disengage the same from, the container.

5. In a door fastener for a hinged door of a container, the combination with a vertically disposed, rotary operating bar mounted on the door; of a guide stirrup depending from the door; a slide having reciprocating movement in said stirrup; a hooked latch element pivotally connected to said slide for tilting movement; means on said bar engaging said slide for reciprocating the latter by rotation of said bar; and a cam projection on said element engaged by said means to tilt said element and lift the hooked portion thereof out of engagement with the container.

6. In a door fastener for a hinged door of a container, the combination with a vertically disposed, rotary operating bar mounted on the door; of a guide stirrup depending from the door; a slide having reciprocating movement in said stirrup toward and away from the container; crank means on said bar for reciprocating said slide by rotation of said bar; a latch pivoted between its ends on said slide, said latch having a hooked portion at its rear end engageable with said container for holding the slide against movement outwardly away from the container; and a tail portion at its forward end; a cam projection on said tail portion over which said crank means rides for rocking said latch to lift the hooked portion thereof out of engagement with the container; and abutment means on the container with which said latch is engageable to hold the slide against inward movement toward said container.

7. In a door fastener for a hinged door of a container, the combination with a vertically disposed, rotary operating bar mounted on the door; of a guide stirrup depending from said door; a slide having reciprocating sliding movement in said stirrup toward and away from the container; said slide having a cam slot therein; a latch pivoted between its ends on said slide, said latch having a tail portion at one end extending into the cam slot of said slide, and a hook at the other end, said latch being tiltable to raise and lower the hooked end thereof; a raised cam projection on said tail portion of said latch; and a crank member on said bar including a crank pin engageable in said cam slot to reciprocate the slide in reverse directions when said bar is rotated, said crank pin riding over the cam projection of said latch to raise and lower the hooked end thereof, said hooked end, when lowered, being engaged with cooperating locking means on said container for holding the slide against movement outwardly away from the container.

STACY B. HASELTINE.

No references cited.